(12) United States Patent
Song et al.

(10) Patent No.: US 12,742,979 B2
(45) Date of Patent: Sep. 22, 2026

(54) MULTI-FOCUSING LENSES HAVING MULTIPLE WAVEPLATE

(71) Applicant: IUCF-HYU (INDUSTRY-UNIVERSITY COOPERATION FOUNDATION HANYANG UNIVERSITY), Seoul (KR)

(72) Inventors: Seok Ho Song, Seoul (KR); Seung Min Lee, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 377 days.

(21) Appl. No.: 18/285,033

(22) PCT Filed: Mar. 21, 2022

(86) PCT No.: PCT/KR2022/003862

§ 371 (c)(1),
(2) Date: Jan. 30, 2024

(87) PCT Pub. No.: WO2022/211336

PCT Pub. Date: Oct. 6, 2022

(65) Prior Publication Data

US 2024/0184142 A1 Jun. 6, 2024

(30) Foreign Application Priority Data

Apr. 2, 2021 (KR) ........................ 10-2021-0043099

(51) Int. Cl.
*G02C 7/06* (2006.01)

(52) U.S. Cl.
CPC ........... *G02C 7/06* (2013.01); *G02C 2202/24* (2013.01)

(58) Field of Classification Search
CPC . G02C 7/06; G02C 7/04; G02C 7/041; G02C 2202/24; G02B 5/30; G02B 5/3083;
(Continued)

(56) References Cited

U.S. PATENT DOCUMENTS 9,753,193 B2 9/2017 Tabirian et al.
10,191,191 B2 1/2019 Tabirian et al.
(Continued)

FOREIGN PATENT DOCUMENTS

JP H08- 507158 A 7/1996
JP 2017-523445 A 8/2017
(Continued)

OTHER PUBLICATIONS

International Search Report for PCT/KR2022/003862 dated Jun. 30, 2022.

*Primary Examiner* — Travis S Fissel
(74) *Attorney, Agent, or Firm* — Sughrue Mion, PLLC

(57) ABSTRACT

Disclosed is a multifocal lens having multiple waveplates. More particularly, the multifocal lens having multiple waveplates includes a lens having an incident surface and an opposite surface thereof, and two or more waveplates disposed on the lens in a direction of the same axis of the lens and made of a birefringent material, wherein, in phase distribution of the waveplates, a location where a focal point is formed changes as a phase section (X) between a center of the lens and a point where a phase rapidly changes, wherein, in the same phase section (X) between neighboring first and second waveplates, a phase at the second waveplate decreases when a phase at the first waveplate increases.

13 Claims, 12 Drawing Sheets

(58) Field of Classification Search
CPC ......... G02B 21/36; G02B 21/361; G02F 1/01; G02F 1/0128; G02F 1/13
USPC ..................................................... 351/159.41
See application file for complete search history.

(56) References Cited

U.S. PATENT DOCUMENTS

2013/0286309 A1 10/2013 Valley et al.
2016/0047956 A1* 2/2016 Tabirian .................. G02C 7/12
385/11
2020/0025987 A1 1/2020 Tabirian et al.

FOREIGN PATENT DOCUMENTS

JP 2019-113629 A 7/2019
KR 2001-0033714 A 4/2001

* cited by examiner

【FIG. 1】
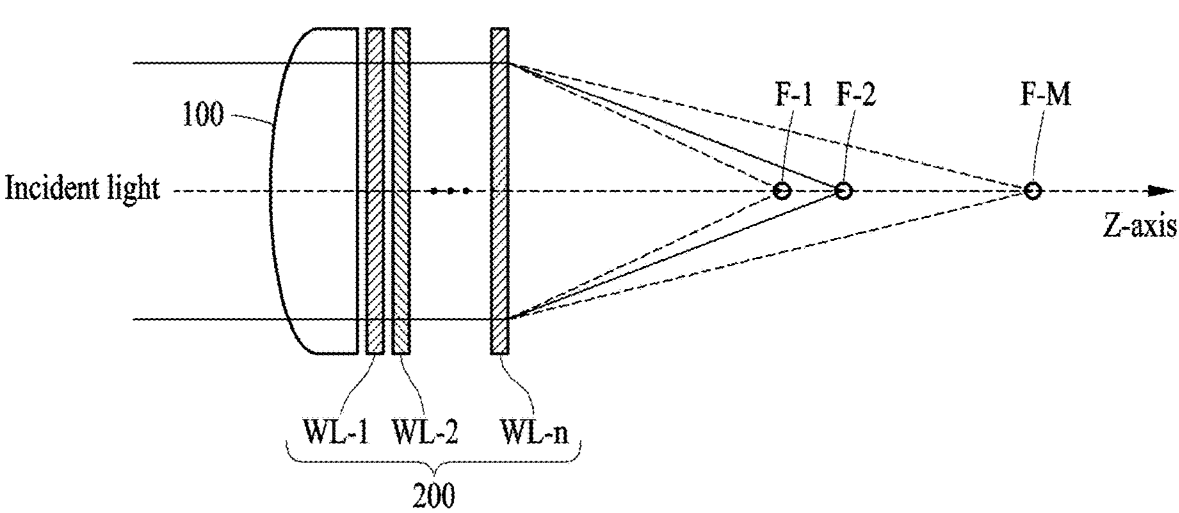

【FIG. 2】
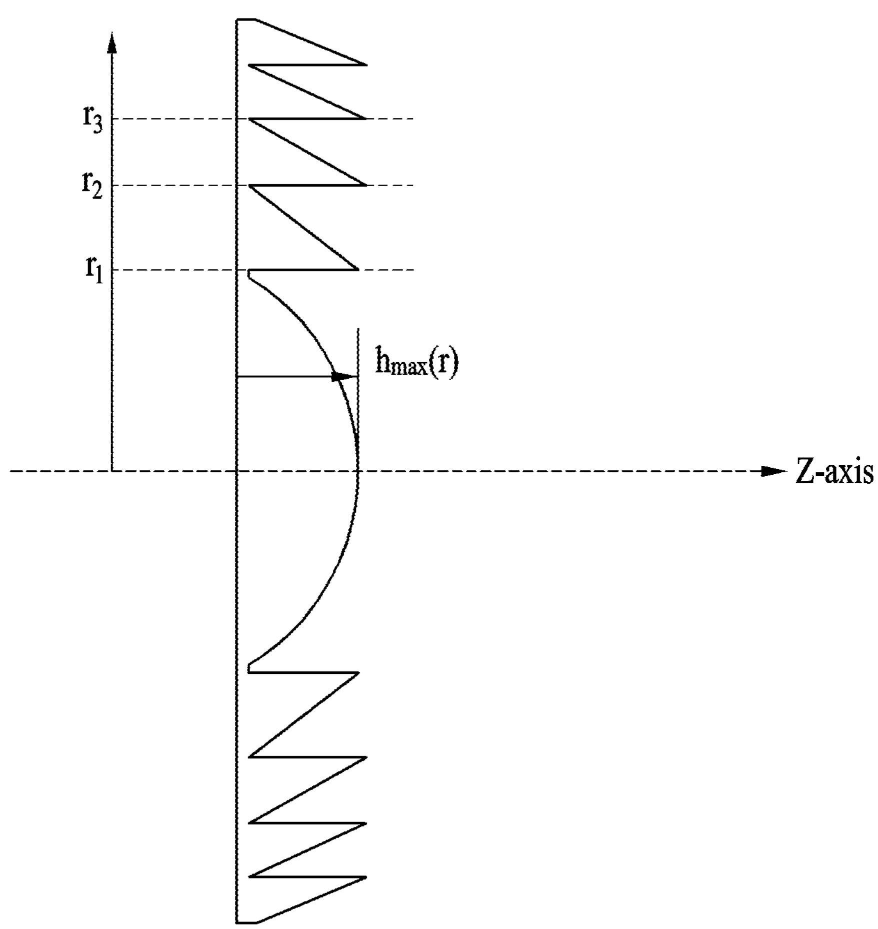

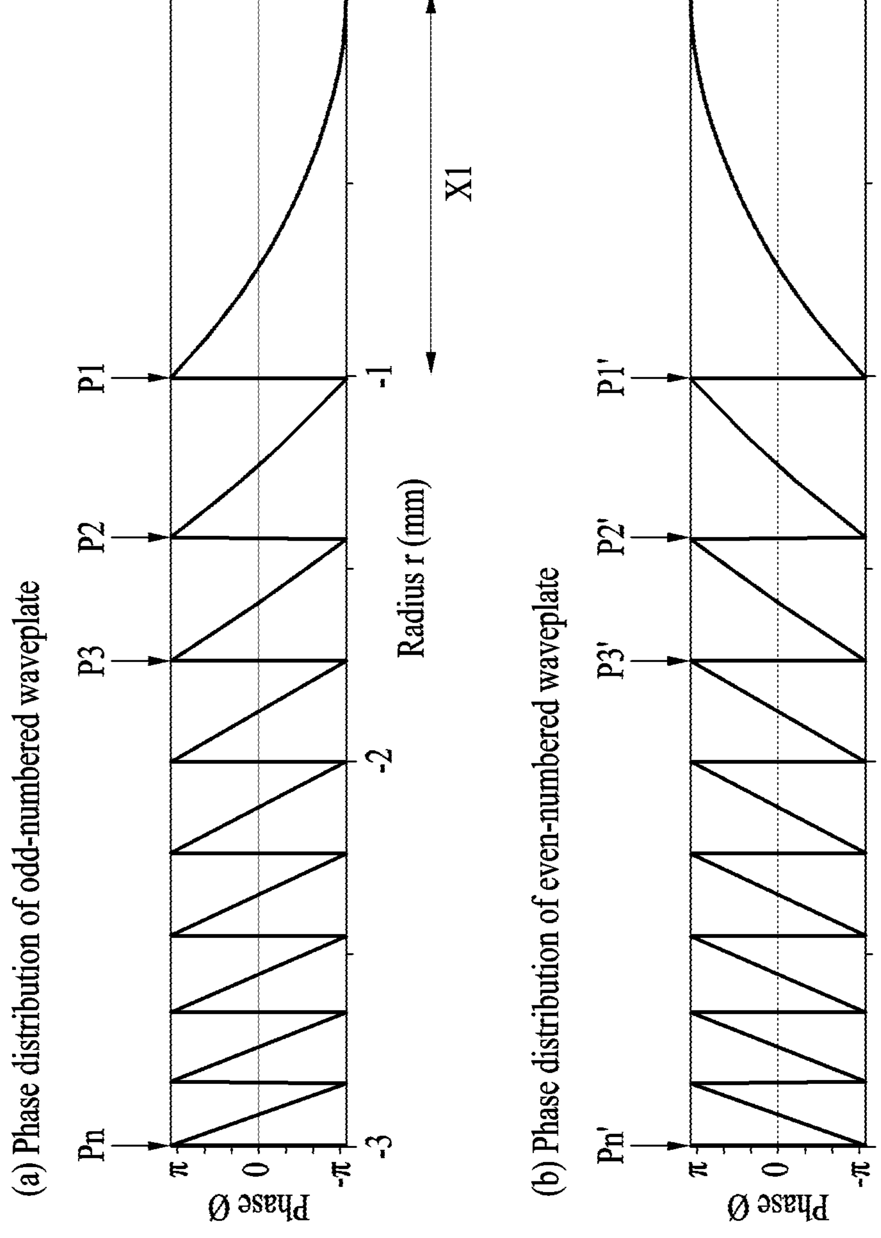
[FIG. 3]

【FIG. 4】
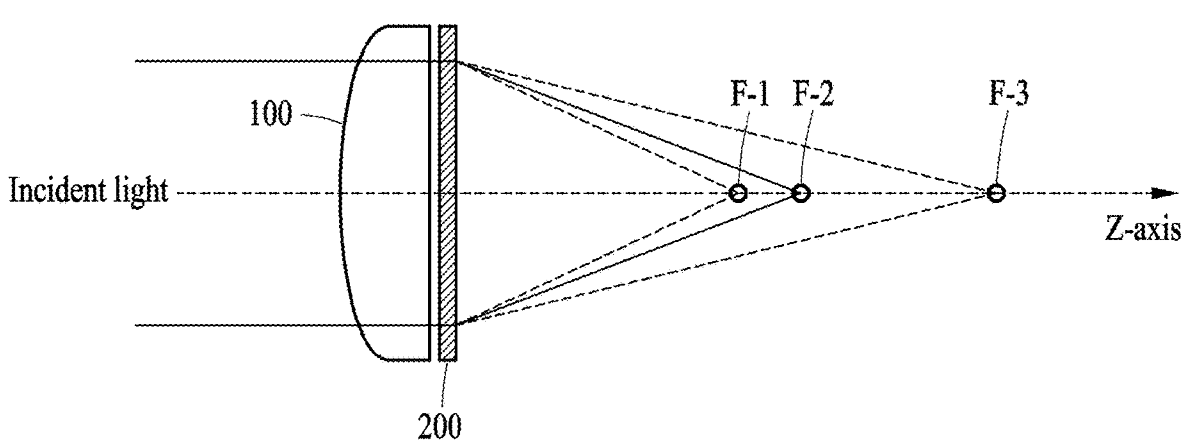

【FIG. 5】
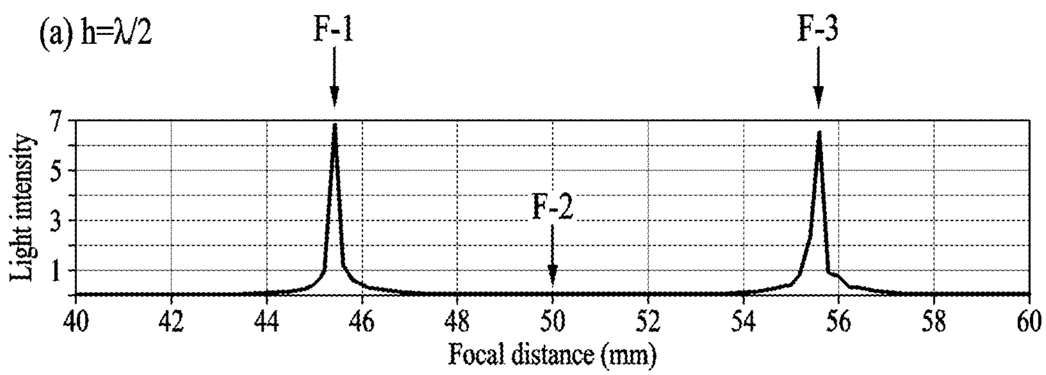
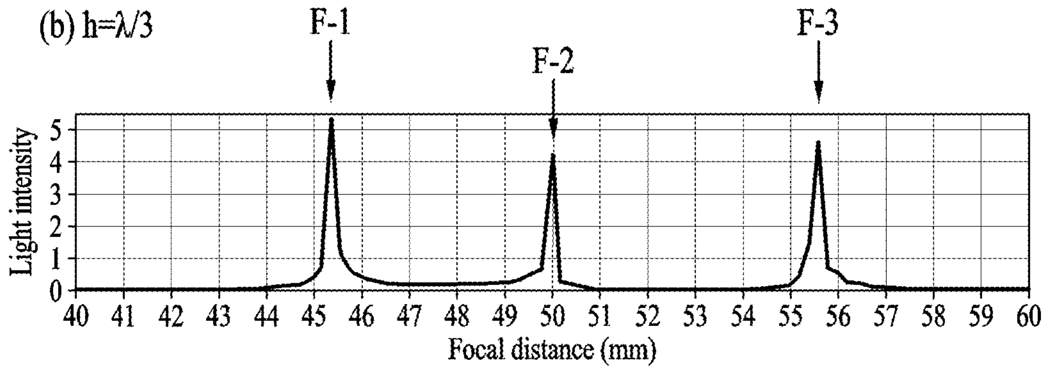
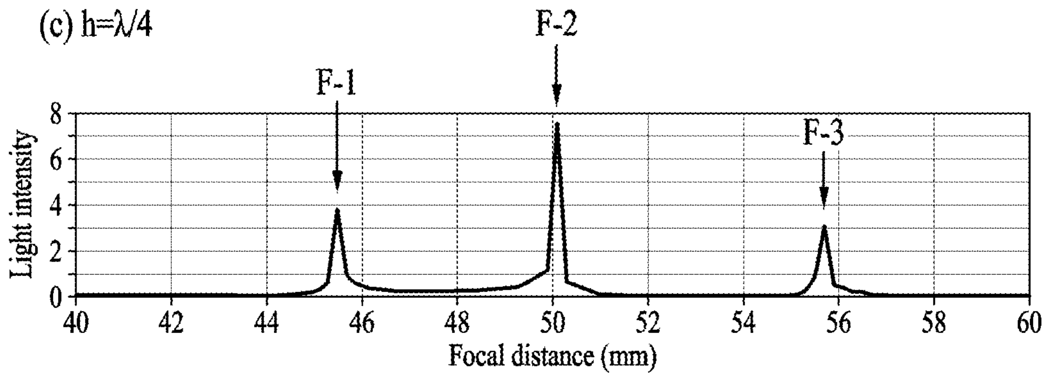

【FIG. 6】
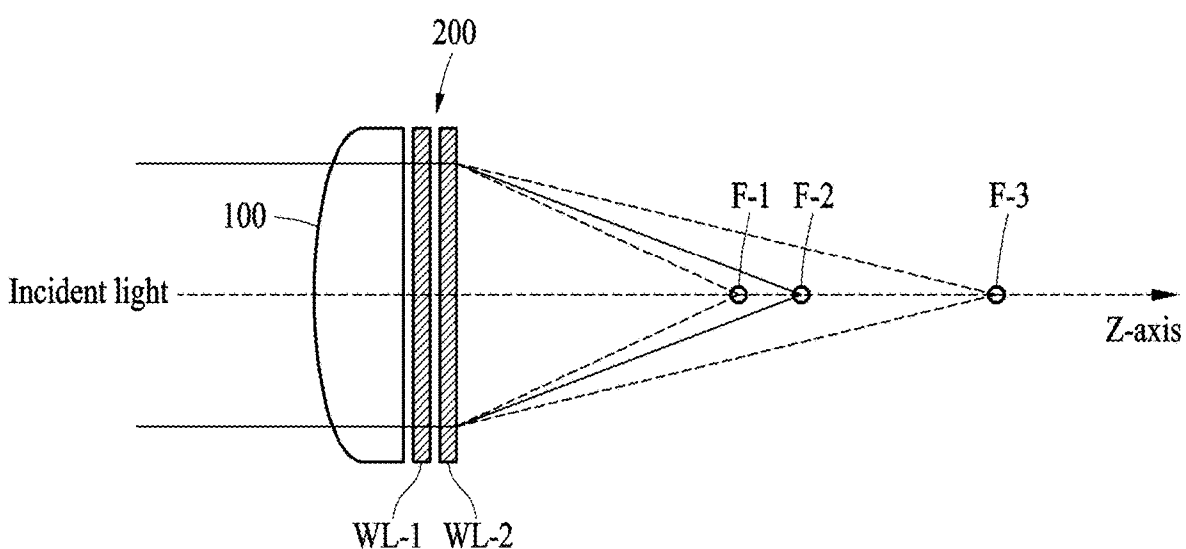

【FIG. 7】
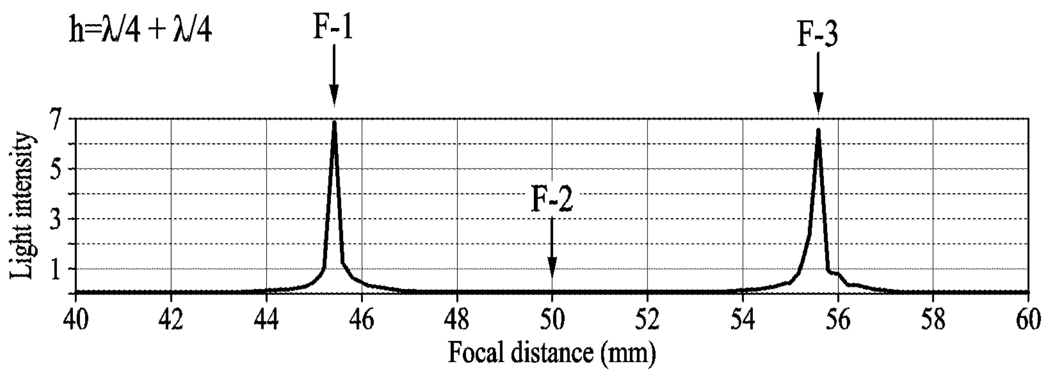

【FIG. 8】
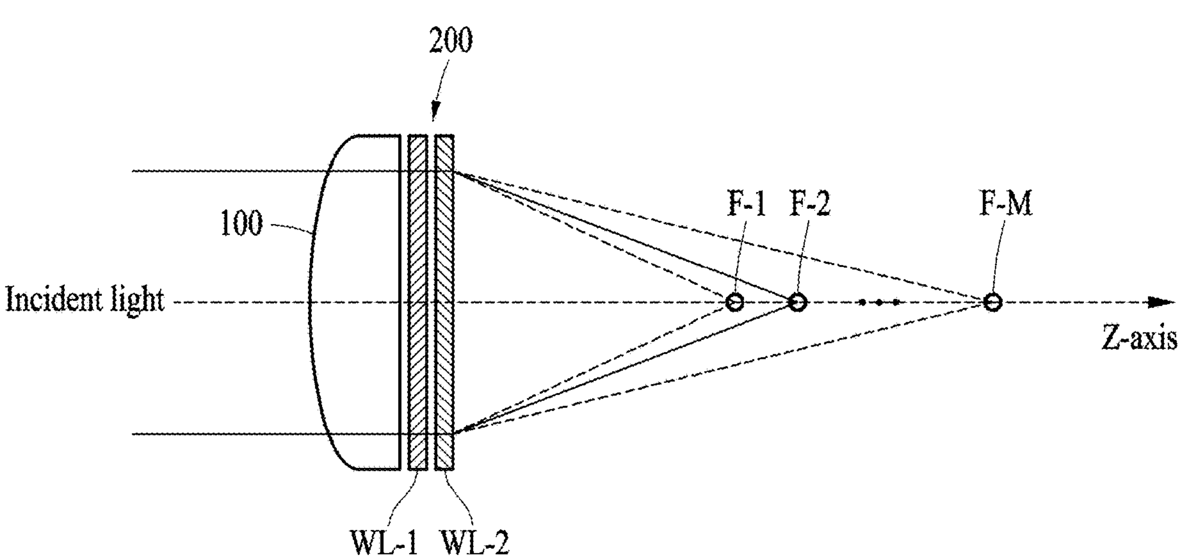

【FIG. 9】
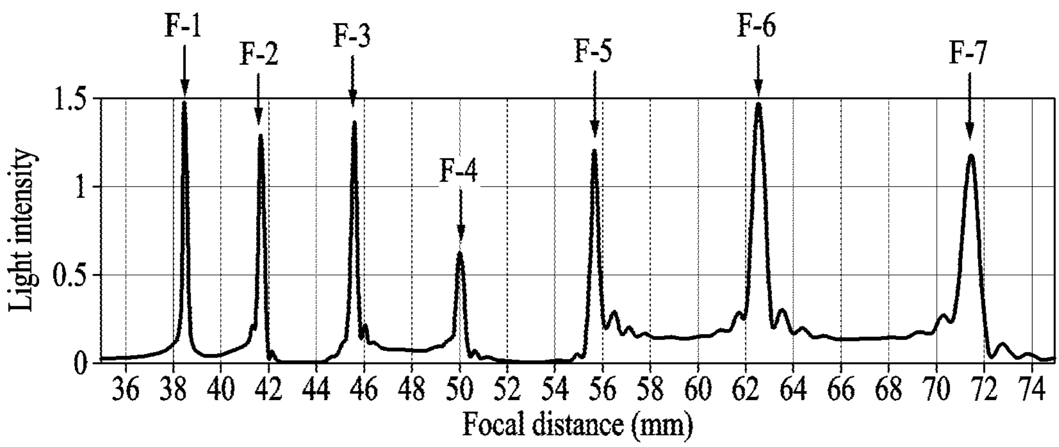

【FIG. 10】
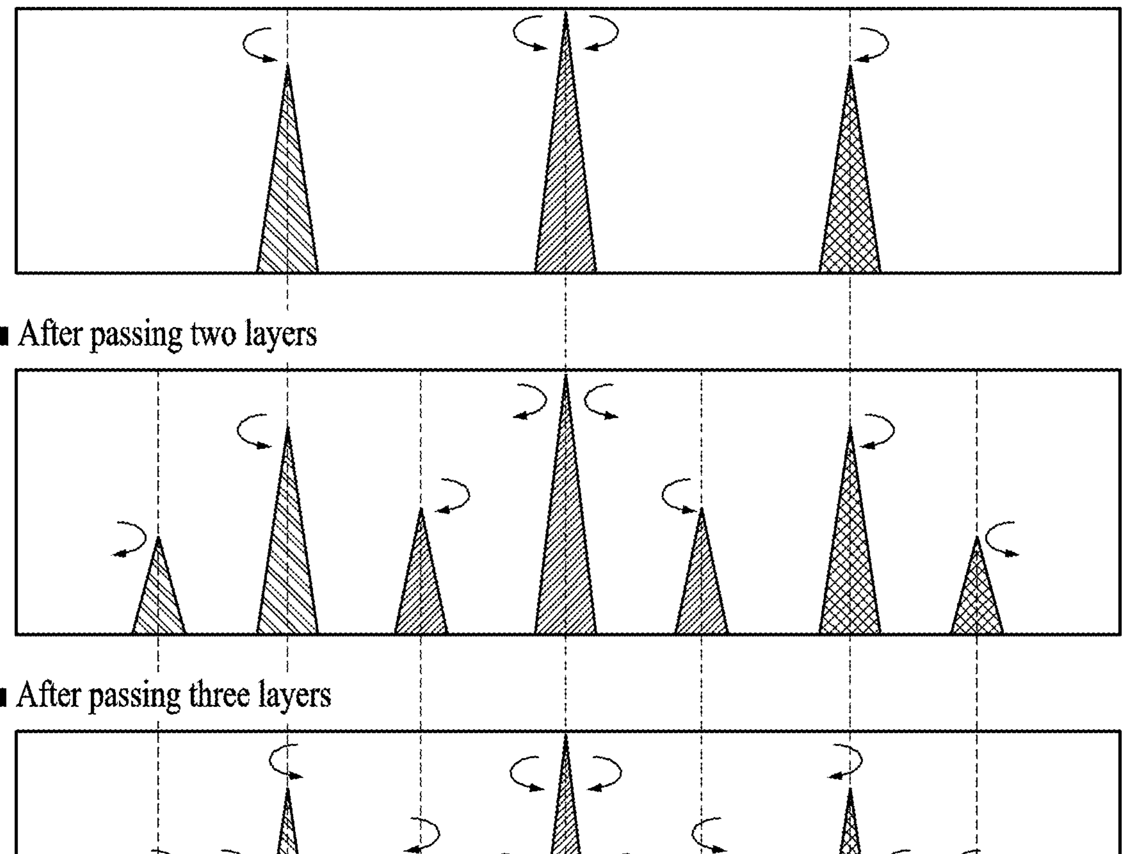

[FIG. 11]
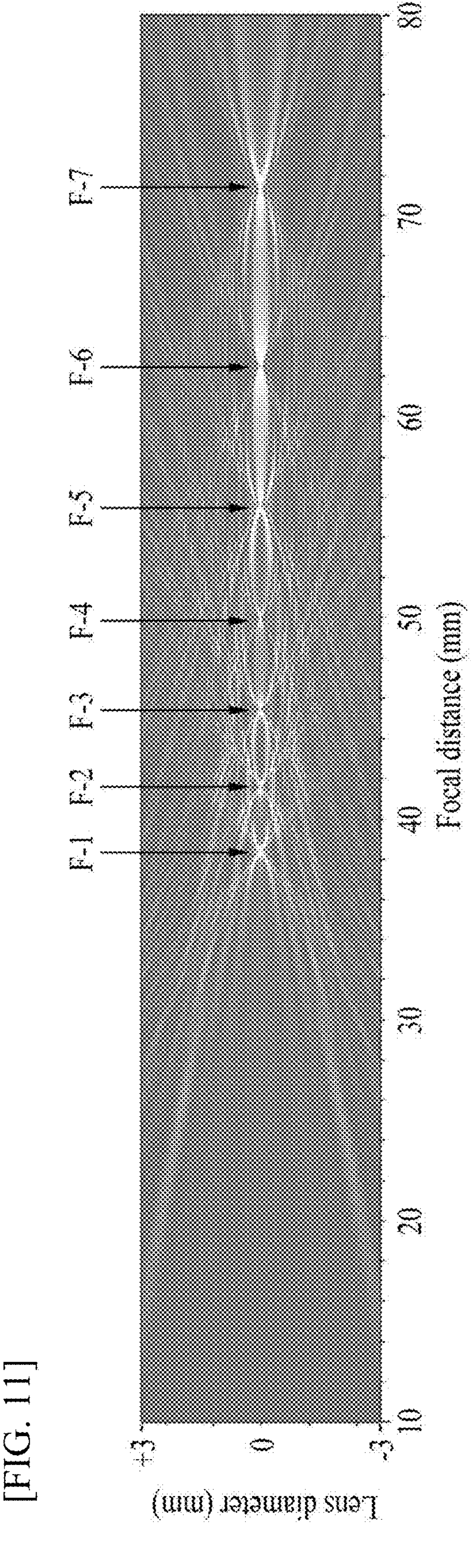

【FIG. 12】
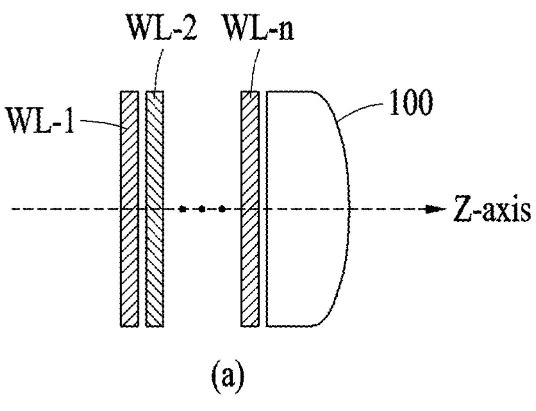
(a)
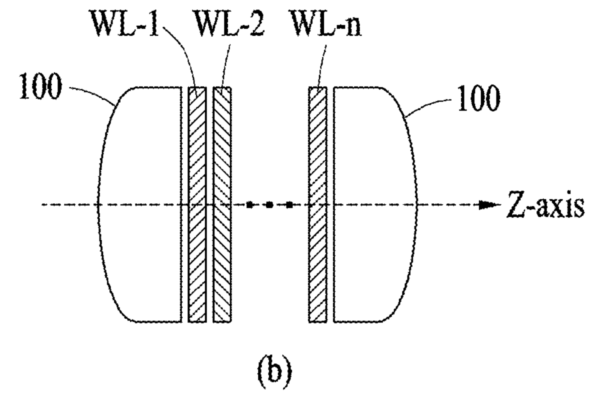
(b)
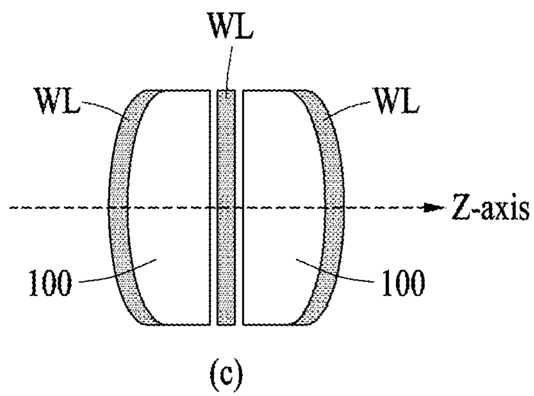
(c)
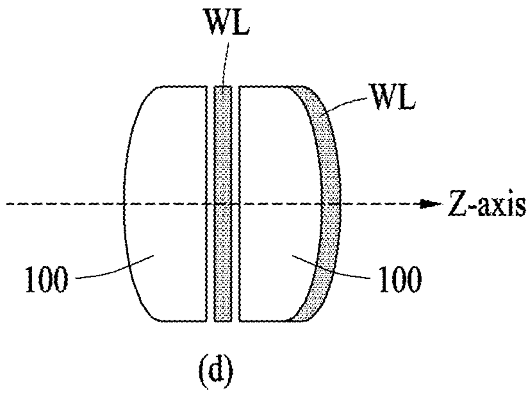
(d)
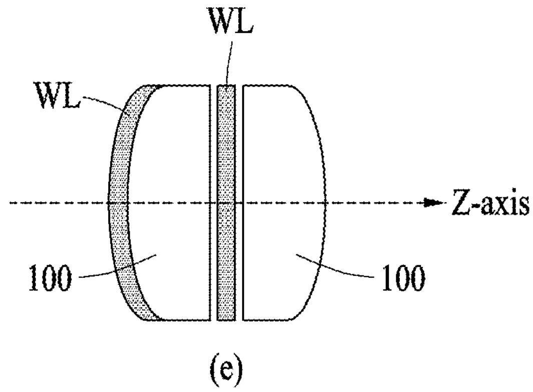
(e)
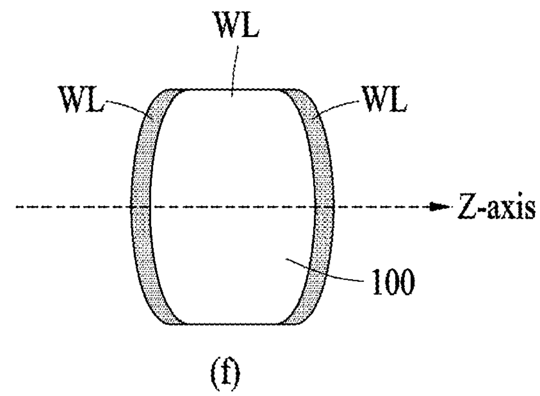
(f)

MULTI-FOCUSING LENSES HAVING MULTIPLE WAVEPLATE

CROSS-REFERENCE TO RELATED APPLICATION

This application is a National Stage of International Application No. PCT/KR2022/003862 filed Mar. 21, 2022, claiming priority based on Korean Patent Application No. 10-2021-0043099 filed Apr. 2, 2021, the disclosure of which is incorporated by reference herein in its entirety.

TECHNICAL FIELD

The present invention relates to a multifocal lens having multiple waveplates, and more particularly to a multifocal lens having multiple waveplates which can increase the number of focal points compared to a lens with less than two waveplates by disposing two or more waveplates on the front or back of a lens.

BACKGROUND ART

Examples of common vision-impairing diseases include myopia and hyperopia. These diseases are usually due to an imbalance between the length of the eye and the focus of the eye's optical elements. Myopia focuses on the front of the retina, and hyperopia focuses on the back of the retina. Myopia typically occurs because the axial length of the eye grows longer than the focal length of the eye's optical components, that is, the eye grows too long. Hyperopia typically occurs because the axial length of the eye is too short compared to the focal length of the eye's optical components, that is, the eye does not grow long enough.

The ability to adjust focal length, i.e., to focus on near and distant objects without relying on changes in focal length, can be improved by using intraocular multifocal lenses or contact lenses. Multifocal lenses have different focal lengths for near and far vision.

Among the techniques for manufacturing multifocal diffractive lenses, a method involving a diffractive waveplate element made of a birefringent material is known. This method has the advantage of a relatively easy manufacturing process and low cost.

As a prior art regarding a multifocal lens having a diffractive waveplate element, there is U.S. Pat. No. 9,753,193 (METHODS AND APPARATUS FOR HUMAN VISION CORRECTION USING DIFFRACTIVE WAVEPPLATE LENSES).

However, since the lens of U.S. Pat. No. 9,753,193 has an overall structure of a single thin film layer, the fast and slow axis arrays of birefringent materials arranged in a single thin film layer should be properly arranged so as to form double or triple or more multi-focus while minimizing phase distribution and optical aberration. This process is very complicated.

DISCLOSURE

Technical Problem

Therefore, the present invention has been made in view of the above problems, and it is one object of the present invention to provide a multifocal lens having multiple waveplates which can increase the number of focal points, compared to an existing multifocal lens having a diffractive waveplate element, by disposing multiple waveplates in a lens to have phases of complementary relation.

Technical Solution

In accordance with an aspect of the present invention, the above and other objects can be accomplished by the provision of a multifocal lens having multiple waveplates, the multifocal lens includes: a lens having an incident surface and an opposite surface thereof; and two or more waveplates disposed in a direction of the same axis as the lens and made of a birefringent material, wherein respective phases of neighboring waveplates have opposite phase signs to have a complementary relationship.

Here, a complementary relation of phases means that the slope signs of phase values between two waveplates are opposite to each other. A case in which the phase values of two waveplates are $\Phi$ and $-\Phi$, respectively, where the magnitude of the absolute value is the same and only the sign is opposite or a case in which the magnitude of the absolute value is different and the sign is opposite is also an example wherein the phases are in a complementary relation. In the present invention, only the complementary relationship wherein the phase values of neighboring two waveplates have opposite signs, such as $\Phi$ and $-\Phi$, respectively, is described. However, a case wherein two neighboring waveplates have opposite slope signs of phase values in a phase range of $-\pi$ to $+\pi$ may also be applied.

According to an embodiment, light intensity at a point where a focal point is formed may change as thicknesses of one or more of the waveplates change.

According to an embodiment, when the thicknesses of the waveplates are adjusted such that light intensity at a location where one focal point is formed becomes 0, the number of focal points may change.

According to an embodiment, the number of focal points may be calculated by Equation 1 below:

$$N=4\times 2^{m-1} \quad \text{<Equation 1>}$$

where N represents the number of focal points, and m represents the number of waveplates.

According to an embodiment, the location of the focal point may be calculated by repeating Equation 2 below for the number of waveplates:

$$\frac{1}{f_N}=\frac{1}{f_{FL}}+\frac{1}{f_{WL-1}}+\frac{1}{f_{WL-2}}+\cdots+\frac{1}{f_{WL-N}} \quad \text{< Equation 2 >}$$

where $f_N$ represents a focal distance after passing a last waveplate, and $f_{LW-n}$ represents a focal distance of each waveplate.

According to an embodiment, in phase distribution of the waveplates, a location where a focal point is formed changes as a phase section X between a center of the lens and a point, where a phase rapidly changes, changes.

Here, in the same phase section (X) between neighboring first and second waveplates, a phase at the second waveplate may decrease when a phase at the first waveplate increases.

Meanwhile, a focal point generated by the lens and the waveplates may be further formed in a diameter direction of the lens.

According to an embodiment, two or more waveplates may be stacked and disposed on an incident surface of the lens or an opposite surface thereof.

According to another embodiment, among the waveplates, one or more waveplates may be disposed on an incident surface of the lens, and remaining one or more waveplates may be disposed on an opposite surface of the lens.

Here, one or more waveplates of the waveplates may be disposed on an incident surface or opposite surface of the lens having a curved shape and may have a shape corresponding to the curved shape.

According to another embodiment, one or more waveplates of the waveplates may be disposed on an incident surface of the lens having a flat shape or an opposite surface thereof and may have a shape corresponding to the flat shape.

According to an embodiment, among the waveplates, one or more waveplates may be disposed on an incident surface of the lens having a first curved shape and may have a shape corresponding to the first curved shape, and remaining one or more waveplates may be disposed on an opposite surface of the lens having a second curved shape and may have a shape corresponding to the second curved shape.

According to another embodiment, the lens may include: a first lens whose incident surface has a curved shape and whose opposite surface has a flat shape; and a second lens whose surface facing the first lens has a flat shape and whose opposite surface has a curved shape, wherein the waveplates are disposed at any one or more positions of on an incident surface of the first lens, between the first and second lenses, and on an opposite surface of the second lens.

Here, among the waveplates, one or more waveplates may be disposed on the incident surface of the first lens, and remaining one or more waveplates may be disposed between the first and second lenses or on the opposite surface of the second lens.

According to another embodiment, one or more waveplates among the waveplates may be disposed between the first and second lenses, and remaining one or more waveplates may be disposed on the opposite surface of the second lens.

According to still another embodiment, two or more waveplates among the waveplates may be stacked and disposed on an incident surface of the first lens, between the first and second lenses, or on an opposite surface of the second lens.

Advantageous Effects

In accordance with the present invention, the number of focal points can be increased in proportion to the number of waveplates. By using this, an ophthalmic lens suitable for a user's disease, such as an intraocular lens (IOL) for the treatment of myopia and hyperopia, and a contact lens can be easily manufactured.

In addition, the present invention can be applied not only to vision correction but also to industrial fields, such as microscopes and cameras, requiring a multifocal lens.

In the present invention, the total number of waveplates, the curvature of a refractive lens surface, the refractive index distribution of each waveplate and the like can be varied to achieve the refractive compensation required for distance and near vision together with other lenses in a visual system.

Further, the number of focal points can be adjusted within the maximum number of focal points because the degree of light intensity changes at the location where a focal point is formed when the thickness of a waveplate is changed.

DESCRIPTION OF DRAWINGS

FIG. 1 illustrates an overall configuration of a multifocal lens having multiple waveplates according to an embodiment of the present invention.

FIG. 2 illustrates a cross-section of an existing diffractive lens.

FIG. 3 illustrates the phase distribution of a waveplate according to an embodiment of the present invention.

FIG. 4 illustrates a state in which one waveplate is disposed on a lens.

FIG. 5 illustrates the focal point locations and light intensity distribution depending upon a thickness change of the waveplate of FIG. 4.

FIG. 6 illustrates a state where two waveplates are stacked and disposed on a lens, but not in complementary relation.

FIG. 7 illustrates the locations and light intensity distribution of focal points when each thickness of the waveplate of FIG. 6 is $\lambda/4$.

FIG. 8 illustrates a state in which two waveplates in a complementary relationship are stacked and disposed on a lens according to an embodiment of the present invention.

FIG. 9 illustrates the location of focal points and light intensity distribution when each thickness of the waveplates of FIG. 8 is $\lambda/4$.

FIG. 10 illustrates the number of focal points formed after incident light passes through a waveplate layer according to an embodiment of the present invention.

FIG. 11 illustrates focal points formed in space when two waveplates in a complementary relation are stacked and disposed on a lens according to an embodiment of the present invention.

FIG. 12 illustrates various embodiments of the present invention in which a waveplate is disposed on a lens.

BEST MODE

Hereinafter, a multifocal lens having multiple waveplates according to a preferred embodiment will be described in detail with reference to the accompanying drawings. Here, the same symbols are used for the same components, and repetitive descriptions and detailed descriptions of known functions and configurations that may unnecessarily obscure the gist of the invention are omitted. Embodiments of the invention are provided to more completely explain the present invention to those with average knowledge in the art. Therefore, the shapes and sizes of elements in the drawings may be exaggerated for clearer explanation.

FIG. 1 illustrates an overall configuration of a multifocal lens having multiple waveplates according to an embodiment of the present invention, FIG. 2 illustrates a cross-section of an existing diffractive lens, and FIG. 3 illustrates the phase distribution of a waveplate according to an embodiment of the present invention.

Referring to FIG. 1, a waveplate 200 is disposed on a multifocal lens having multiple waveplates according to an embodiment of the present invention. Here, the lens 100 is a refractive lens and includes an incident surface, on which light is incident, and an opposite surface thereof. The direction of progress of incident light is in the direction of the central axis (z-axis) of the lens 100.

According to an embodiment of the present invention, two or more waveplates 200 are disposed on the lens 100 in the same direction as the central axis (z-axis) of the lens 100. In this description, the term "dispose" includes not only the case where two or more waveplates 200 are stacked and arranged in order, but also the case where the waveplates (LW, PW) are disposed on the lens 100 to be spaced from each other due to the lens 100 interposed therebetween. The disposed waveplates 200 may be attached to the lens 100 or attached to each other. Another embodiment in which the two or more waveplates 200 are disposed in the lens 100 will be described below.

The lens waveplate 200 is an optical element that changes the polarization state of light and is a lens (waveplate lens: WL) made of a birefringent material. The lens waveplate 200 is also called a phase retardation plate. In a phase retardation plate, a polarization direction in which the speed of light is fast is called a fast axis, and a polarization direction which has an axis perpendicular to the fast axis and whose light speed is slow is called a slow axis. The phase retardation plate includes a Half Wave Plate (HWP) that retards the phase of λ/2; and a Quarter Wave Plate (QWP) that retards the phase of λ/4. For example, when a linearly polarized beam passes at an angle of θ with respect to a fast axis of the HWP, it is rotated and polarized by 2θ, and when the linearly polarized beam passes at an angle of 45 degrees with respect to a fast axis of the QWP, a circularly polarized beam is produced. The polarization conversion technology of linearly polarized or circularly polarized beams that have passed through HWP and QWP is a known technology, so a detailed description thereof will be omitted.

Meanwhile, as shown in FIG. 2, a diffractive lens, commonly known as a Fresnel lens, has a sawtooth shape as the radius increases from the center of the diffractive lens, and has a phase distribution as shown in Equation 1 below depending on the size of the radius:

$$\Phi(r) = 2\pi \times \left\{ j - \frac{r_j^2}{(2\lambda F)} \right\} \quad \text{< Equation 1 >}$$

where $r_j$ represents the jth radius based on the center of a diffractive lens, λ represents the wavelength length of incident light, and F represents the central focal distance of a diffractive lens.

In addition, as a phase distribution in Equation 1 moves away from a diffractive lens, multiple focal points are formed as in Equation 2 below.

$$F_m = \frac{F}{m} \quad \text{< Equation 2 >}$$

where m is a diffraction order of a diffractive lens.

Meanwhile, unlike the shape of the Fresnel lens described above, the waveplate 200 according to the present invention is formed in an annular shape and is manufactured to have a certain thickness depending on a distance from the center of the waveplate 200, thereby performing the function of a Fresnel lens. Here, the arrangement directions of fast and slow axes of the waveplate according to the present invention are adjusted when incident light has left-handed circular polarization or right-handed circular polarization (RHCP), so a phase distribution with multiple focal points similar to Equations 1 and 2 is formed.

The waveplate 200 according to an embodiment of the present invention is a transparent material and may be made of an anisotropic material such as a liquid crystal or, more generally, a reactive mesogen. The thickness of the waveplate 200 may be smaller than the wavelength of the incident light, equal to the wavelength of the incident light, or greater than the wavelength of the incident light.

In relation to a manufacturing method of the waveplate 200 according to an embodiment of the present invention, a related research paper "J-H. Kim et al. "Fabrication of ideal geometric-phase holograms with arbitrary wavefronts", Optica Vol. 2, No. 11, November (2015)" may be referenced. According to the related preceding research paper, the waveplate 200 is manufactured by forming a pattern to control optical axis rotation at its local location. Here, examples of a method for patterning the optical axis rotation of an anisotropic material that makes up the waveplate 200 include a rubbing method of forming fine grooves on the surface of a lens waveplate LW by mechanical means; a photo-alignment method of arranging in a certain direction according to the polarization of incident light; and the like.

FIG. 1 illustrates an embodiment where a waveplate 200 is stacked on the opposite surface of a lens 100. Specifically, first waveplate (WL-1) to n-th waveplate (WL-n) are stacked in order on the opposite surface of the lens 100, and an odd-numbered waveplate (e.g., a first waveplate) and an even-numbered waveplate LW (e.g., a second waveplate) are disposed adjacent to each other. When incident light passes through a final waveplate of the present invention, m focal points (F-1, F-2, . . . F-m) are formed.

The phase distribution of the waveplate 200 of the present invention is examined. FIG. 3 illustrates a phase distribution representing a phase difference of light ray passing through a position separated by a radius r with respect to the center of an optical axis (point at r=0) in a transmitted wavefront incident on the waveplate 200. The phase difference distribution shown in FIG. 3 is within the wavelength range of incident light and has a sawtooth cross-section.

Graph (a) of FIG. 3 represents the phase distribution shown in the odd-numbered waveplate, and graph (b) of FIG. 3 represents the phase distribution shown in the even-numbered waveplate LW. Examining the phase distribution, a point where the phase suddenly changes (changing from +π to −π or −π to +π) appears as the radius increases. In FIG. 3, points where the phase suddenly changes in the phase distribution of the odd-numbered waveplate appear as P1 to Pn, and points where the phase changes suddenly in the phase distribution of the even-numbered waveplate appear as P1' to Pn'. The phase position Pn corresponds to the position of $r_j$ in Equation 1. Here, a phase section from the center (r=0) to P1 is called X1 section, and a phase section from the center (r=0) to P1' is called X1' section. Although not shown in FIG. 3, the phase sections up to P2 and P2 based on the center (r=0) are called X2 and X2' sections, respectively, and the following phase sections may be displayed in the above-described manner. In this description, a phase section from X1 and thereafter and a phase section from X1 and thereafter are collectively referred to as X section.

When examining the phase distribution according to an embodiment of the present invention while referring to FIG. 3 again, the phase at the even-numbered waveplate decreases whereas the phase at the odd-numbered waveplate increases as the distance from the radius center increases in the same phase section (X). That is, the phase sign (+Φ) of the odd-numbered waveplate and the phase sign(−Φ) of the even-numbered waveplate LW (LW) should be opposite to each other. In this description, this relationship is called a complementary relation. Here, the value (absolute value) of the phase magnitude may be the same or different.

Here, if the waveplate 200 is manufactured such that the spacing of the X section varies, the position where the focal point is formed can be adjusted. Specifically, referring to FIG. 3 and Equation 1, the phase value and phase position (Pn or rj) within a range of −π to +π are determined when one waveplate 200 is manufactured, and when the waveplate 200 is manufactured so that the interval of the X section changes, the phase position (Pn or rj) changes and the focal length (F in Equation 1) also changes. For example, the focal distance also decreases as the interval between X sections decreases.

According to another embodiment of the present invention, in the same phase section (X), the phase at the odd-numbered lens waveplate LW may decrease, and the phase at the even-numbered lens waveplate LW may increase.

Hereinafter, to examine the effect of the multifocal lens having multiple waveplates according to the present invention, a case where one waveplate 200 is disposed and a case where the phase distribution is not in a complementary relation and waveplates 200 are disposed next to each other are compared with the multifocal lens having multiple waveplates according to the present invention.

FIG. 4 illustrates a state in which one waveplate is disposed on a lens, and FIG. 5 illustrates the focal point locations and light intensity distribution depending upon a thickness change of the waveplate of FIG. 4.

Referring to FIGS. 4 and 5, when the waveplate 200 is disposed as a single layer on the lens 100, three focal points F-1, F-2 and F-3 are generated for linearly polarized incident light. Here, when the thicknesses of the waveplates are λ/2, λ/3, and λ/4, the light intensity appears at each focal point location. As such, in the case of a multi-focal point lens in which the waveplate 200 is arranged in a single layer on the lens 100, the total number of focal points is limited to a maximum of three. Meanwhile, it can be seen that when the thickness of the waveplate 200 changes, the light intensity at the focal point location changes.

FIG. 6 illustrates a state where two waveplates are stacked and disposed on a lens, but not in complementary relation, and FIG. 7 illustrates the locations and light intensity distribution of focal points when each thickness of the waveplate of FIG. 6 is λ/4.

Referring to FIGS. 6 and 7, a first waveplate WL-1 and a second waveplate LW-2 are stacked and disposed on the lens 100. Here, the first waveplate WL-1 and the second waveplate LW-2 are disposed next to each other, but the phase distribution in each of the waveplates is not in a complementary relation. In addition, when the thickness of each waveplate is λ/4, the total thickness is λ/2. This is a case where the thickness of the waveplate is λ/2, and the total number of focal points is limited to a maximum of 3 (see FIG. 9(5)).

When multiple waveplates 200 that do not have a complementary relation are disposed on the lens 100, the maximum number of focal points may be obtained as in Equation 3 below:

$$N=2m+1 \quad \text{<Equation 3>}$$

where N represents the number of focal points and m represents the number of lens waveplates.

In addition, Equation 3 may also be applied when one waveplate is disposed on the lens 100.

FIG. 8 illustrates a state in which two waveplates in a complementary relationship are stacked and disposed on a lens according to an embodiment of the present invention, and FIG. 9 illustrates the location of focal points and light intensity distribution when each thickness of the waveplates of FIG. 8 is λ/4.

Referring to FIGS. 8 and 9, the first waveplate WL-1 and the second waveplate WL-2 are stacked and disposed on the lens 100. Here, the first waveplate WL-1 and the second waveplate WL-2 are disposed next to each other, and the phase distribution of each of the waveplate is in a complementary relation. In addition, the thickness of each of the waveplates is λ/4, the overall total thickness is λ/2. The number of focal points formed by the multifocal lens is up to 7.

As such, when a plurality of waveplates 200, which are in a complementary relation, are disposed on the lens 100, the number of maximum focal points increases.

Meanwhile, when the first and second waveplates WL-1 and WL-2 have a complementary relation as described above, the size of the phase may be different. Here, when the size of the phase is different, the value of light intensity may vary without changing the number of focal points.

When multiple waveplates 200 with a complementary relation are disposed on the lens 100, the maximum number of focal points may be obtained as in Equation 4 below:

$$N=4\times 2^{m-1} \quad \text{<Equation 4>}$$

where N represents the number of focal points and m represents the number of waveplates.

The value calculated by Equation 4 is the number of maximum focal points. By adjusting the thickness of the waveplate, i.e., by controlling the light intensity at each focal point location, the number of focal points may be determined by limiting the number of maximum focal points. For example, when seven focal points are formed according to the multifocal lens of the present invention, the same effect as disappearing the focal point at that location may be obtained by adjusting the thickness of at least one waveplate to set the light intensity at at least one focal point location to 0, so that it is possible to reduce the total number of focal points.

FIG. 10 illustrates the number of focal points formed after incident light passes through a waveplate layer according to an embodiment of the present invention.

As shown in FIG. 10, the number of focal points formed according to the number of waveplate layers is a value calculated by Equation 5.

Meanwhile, a method of predicting the light intensity at the focal point location is as follows. Specifically, when right-handed circular polarization or left-handed circular polarization is incident on the waveplate 200, a conversion efficiency to polarization in the opposite direction may be obtained as in Equation 5 below:

$$\eta(\lambda)=\sin^2\left(\frac{\Gamma}{2}\right) \quad \text{< Equation 5 >}$$

Here, $$\Gamma=\frac{2\pi}{\lambda}\Delta nd$$

means phase lag (phase change of incident light). Λ represents the wavelength of incident light, Δn represents the birefringence of the waveplate, and d represents the thickness of the waveplate.

In incident light that is linearly polarized, right-handed circular polarization and left-handed circular polarization are present in the same ratio. When linearly polarized light is incident on the waveplate 200, the direction of circularly polarized light included in the incident light changes. For example, right-handed circular polarization included in linearly polarized light changes to left-handed circular polarization. That is, as linearly polarized light passes through the waveplate 200, left-handed circular polarization and right-handed circular polarization have opposite signs and experience geometric phase lag. Here, the remaining light that is not converted while passing through the waveplate 200 is not affected by geometric phase lag and passes through the waveplate 200 as linearly polarized light. Equation 5 represents the efficiency (called polarization conversion efficiency) of passing through the waveplate 200 without being polarized, and the light intensity at the location where each focal point is formed is affected by polarization-changed efficiency. Here, it can be seen that polarization-changed efficiency varies depending on the thickness of the waveplate 200.

Even when multiple waveplates 200 are arranged, the light intensity at the location where each focal point is formed may be sufficiently predicted using Equation 5.

Meanwhile, when the waveplate 200 is disposed on the lens 100, a method of determining the focal point location is as follows. For explanation, FIGS. 4 and 5 are referred to again. As shown in FIG. 4, when one waveplate 200 is present, the number of focal points is three (F-1, F-2, F-3) according to Equation 3 (or Equation 4). Meanwhile, when the thickness of the waveplate 200 is a thickness that provides a half-wavelength phase lag, linearly polarized light is not generated, so there are two focal points (see FIG. 5(*a*)).

The location of each focal point may be obtained as in Equation 6 below:

$$\frac{1}{f_{1,2,3}} = \frac{1}{f_{FL}} + \frac{1}{F_{WL-1}} \quad \text{< Equation 6 >}$$

where $f_{1,2,3}$ represents a focal distance at F-1, F-2, and F-3 after passing through the waveplate, $f_{FL}$ represents a focal distance of the refractive lens, and $f_{LW-1}$ represents a focal distance of the waveplate.

With regard to the focal distance $f_{LW-1}$ of the waveplate 200, when the incident light is circularly polarized and passes through the waveplate 200 as described above, the sign changes while experiencing phase lag. Accordingly, when a focal distance due to right-handed circular polarization is $+f_{LW-1}$, a focal distance due to left-handed circular polarization is $-f_{LW-1}$. When left-handed circular polarization and right-handed circular polarization pass through the waveplate 200, they are converted into circular polarization with opposite signs, which means that the waveplate 200 functions like a convex lens for one circularly polarized light and like a concave lens for the other circularly polarized light. Meanwhile, when the incident light is linearly polarized light, a focal distance is infinite.

Equation 6 is a formula for calculating three focal distances by one waveplate 200. However, when multiple waveplates 200 are arranged, each focal distance formed by the waveplates 200 may be calculated by repeating Equation 6 as many times as the number of the waveplates 200. Specifically, when one waveplate WL-2 is further added in the state of FIG. 4, each focal distance may be obtained by further adding $$\frac{1}{f_{WL-2}}$$

to the right side of Equation 6. Here, the increased number of foci may be obtained by Equation 4 above. Generalizing this, it is as shown in Equation 7 below:

$$\frac{1}{f_N} = \frac{1}{f_{FL}} + \frac{1}{f_{WL-1}} + \frac{1}{f_{WL-2}} + \dots + \frac{1}{f_{WL-N}} \quad \text{< Equation 7 >}$$

where $f_N$ represents a focal distance after passing the last waveplate, and $f_{LW-n}$ represents a focal distance of each waveplate.

FIG. 11 illustrates focal points formed in space when two waveplates in a complementary relation are stacked and disposed on a lens according to an embodiment of the present invention.

FIG. 11 illustrates the light intensity distribution of multiple focal points spatially generated along a diametric distance of the lens 100 as it moves away from the last waveplate (the second waveplate) in a Z-axis direction. That is, it can be confirmed that a total of 7 focal points (F-1, F-2, . . . F-7) are created not only in the Z-axis direction but also spatially.

FIG. 12 illustrates various embodiments of the present invention in which a waveplate is disposed on a lens.

Referring to FIG. 12, the waveplate 200 may be arranged in various forms depending on the shape and number of the lenses 100. Here, a complementary relation between the neighboring waveplates 200 should be satisfied.

First, a case wherein the waveplate 200 is disposed on one lens 100 is examined.

Referring to FIG. 12(*a*), the waveplate 200 may be arranged in various forms depending on the shape and number of the lenses 100. Here, two or more waveplates (WL-1, WL-2, . . . WL-N) may have a shape corresponding to the flat shape, may be stacked in order, and may be disposed on an incident surface of the lens.

Here, according to another embodiment of the present invention, the waveplates (WL-1, WL-2, . . . WL-N) may have a shape corresponding to the curved shape of the lens 100 and may be stacked and disposed in order on the opposite side of the lens 100.

As another embodiment of the present invention, an incident surface of the lens 100 may be a curved surface and an opposite surface thereof may be formed as a flat surface. Here, two or more waveplates WL-1, WL-2, . . . WL-N may have a shape corresponding to the curved shape of an opposite surface of the lens 100 and may be stacked and disposed in order on an incident surface of the lens 100, or may have a flat shape corresponding to an opposite surface of the lens 100 and may be stacked and disposed in order on the opposite side of the lens 100.

As another embodiment of the present invention, one or more waveplate layers among the waveplates 200 may be disposed on an incident surface (curved or flat surface) of the lens 100, and the remaining one or more waveplates may be disposed on the opposite surface thereof (flat surface or curved surface). Here, when two or more waveplates 200 are placed on an incident surface of the lens 100 or an opposite surface thereof, they may be stacked.

Meanwhile, referring to FIG. 12(*f*), the incident and opposite surfaces of the lens 100 may be formed as curved surfaces as another embodiment of the present invention. Here, the curved surface of the incident surface of the lens 100 is called a first curved surface, and the curved surface of an opposite surface thereof is called a second curved surface. Here, the curvatures of the first curved surface and the second curved surface may be different or the same. Here, one or more waveplates among the waveplates 200 may be disposed on the incident surface of the lens 100 to have a shape corresponding to the first curved shape, and the remaining waveplates may be disposed on the opposite surface of the lens 100 with the second curved shape to have a shape corresponding to the second curved shape. FIG. 12(*f*) illustrates a state wherein one waveplate WL is disposed on each of an incident surface of the lens 100 and an opposite surface thereof.

Next, a case wherein a waveplate layer 200 is disposed on two lenses 100 is examined.

According to another embodiment of the present invention, the lens 100 includes a first lens whose incident surface has a curved shape and whose opposite surface thereof has a flat shape (e.g., the left lens of FIG. 12(*b*)); and a second lens (e.g., the right lens of FIG. 12(*b*)) wherein a surface facing the first lens has a flat shape and an opposite surface thereof has a curved shape. Here, when the curved surface of the first lens is a third curved surface and the curved surface of the second lens is a fourth curved surface, the curvatures of the third curved surface and the fourth curved surface may be the same or different.

Referring to FIG. 12(*b*), the waveplate 200 according to an embodiment of the present invention may be disposed between a flat surface where the first lens and the second lens face each other. Here, two or more waveplates (WL-1, WL-2, . . . WL-N) may be stacked and disposed.

Meanwhile, the waveplates 200 are disposed at one or more locations of the first location, which is an incident surface of the first lens, the second location, which is between the first and second lenses, and the third location, which is the opposite surface of the second lens. Here, the waveplates 200 disposed at the first location and the third location may respectively have shapes corresponding to the shapes of the third and fourth curved surfaces as described above.

Referring to FIG. 12(*c*), the waveplate 200 may be disposed at any of the first to the third locations according to another embodiment of the present invention. FIG. 12(*c*) illustrates a state in which one waveplate layer is respectively disposed at all of the first to third locations. However, there is no limit to the number of the waveplates 200 disposed at each of the first to third locations. Here, when two or more waveplates 200 are disposed at one location, they are stacked and disposed in order.

Referring to FIG. 12(*d*), the waveplate 200 may be disposed only at the second and third locations according to another embodiment of the present invention. Also in this case, it is natural that there is no limit to the number of the waveplates 200 disposed at each of the second and third locations and the two or more waveplates 200 are stacked and disposed in order.

Referring to FIG. 12(*e*), the waveplate 200 may be disposed only at the first and second locations according to another embodiment of the present invention. Also in this case, it is natural that there is no limit to the number of the waveplates 200 disposed at each of the first and second locations and the two or more waveplates 200 are stacked and disposed in order.

Meanwhile, although FIGS. 12(*b*) to (*e*) illustrate states composed of two lenses 100, it is natural that three or more lenses 100 may be included. Also in this case, one or more waveplates 200 may be disposed on each surface on which lenses are disposed.

Meanwhile, the number of the waveplates 200 to be disposed on the lens 100 may be appropriately controlled considering the number of focal points.

Meanwhile, in the present invention, the total number of the waveplates, the curvature of the refractive lens surface, the refractive index distribution of each waveplate, and the like may be varied to achieve the refractive compensation required for distance and near vision with other lenses in the visual system.

Although the present invention has been described with reference to embodiments shown in the accompanying drawings, the embodiments are provided as only exemplary examples, and those skilled in the art will understand that various modifications and equivalent embodiments are possible therefrom. Therefore, the true technical protection scope of the present invention should be determined by the technical spirit of the appended claims.

The invention claimed is:

1. A multifocal lens having multiple waveplates, the multifocal lens comprises:

a lens having an incident surface and an opposite surface thereof; and two or more waveplates disposed on the lens in a direction of a central axis of the lens and made of a birefringent material, wherein, in phase distribution of the waveplates, a location where a focal point is formed changes as a phase section (X) between a center of the lens and a point where a phase rapidly changes, wherein, in the same phase section (X) between neighboring first and second waveplates, a phase at the second waveplate decreases when a phase at the first waveplate increases, and wherein a number of focal points generated by the lens and the waveplates is calculated by Equation 1 below:

$$N=4\times 2^{m-1}-1$$ <Equation 1> where N represents the number of focal points, and m represents a number of waveplates.

2. The multifocal lens according to claim 1, wherein light intensity at a point where a focal point is formed changes as thicknesses of one or more of the waveplates change.

3. The multifocal lens according to claim 2, wherein, when the thicknesses of the waveplates are adjusted such that light intensity at a location where one focal point is formed becomes 0, the number of focal points changes.

4. The multifocal lens according to claim 1, wherein a position of a focal point generated by the lens and the waveplates is calculated according to Equation 2 below depending upon the number of waveplates:

$$\frac{1}{f_N}=\frac{1}{f_{FL}}+\frac{1}{f_{WL-1}}+\frac{1}{f_{WL-2}}+\cdots+\frac{1}{f_{WL-N}}$$ < Equation 2 > where $f_N$ represents a focal distance after passing a last waveplate, and $f_{LW-n}$ represents a focal distance of each waveplate.

5. The multifocal lens according to claim 1, wherein a focal point generated by the lens and the waveplates is further formed in a diameter direction of the lens.

6. The multifocal lens according to claim 1, wherein two or more waveplates are stacked and disposed on the incident surface of the lens or the opposite surface thereof.

7. The multifocal lens according to claim 1, wherein, among the waveplates, one or more waveplates are disposed on the incident surface of the lens, and remaining one or more waveplates are disposed on the opposite surface of the lens.

8. The multifocal lens according to claim 7, wherein one or more waveplates of the waveplates are disposed on the incident surface of the lens having a flat shape or the opposite surface thereof and have a shape corresponding to the flat shape.

9. The multifocal lens according to claim 1, wherein, among the waveplates, one or more waveplates are disposed on the incident surface of the lens having a first curved shape and have a shape corresponding to the first curved shape, and remaining one or more waveplates are disposed on the opposite surface of the lens having a second curved shape and have a shape corresponding to the second curved shape.

10. The multifocal lens according to claim 1, wherein the lens comprises:

a first lens whose incident surface has a curved shape and whose opposite surface has a flat shape; and a second lens whose surface facing the first lens has a flat shape and whose opposite surface has a curved shape, wherein the waveplates are disposed at any one or more of:

an incident surface of the first lens, between the first and second lenses, and an opposite surface of the second lens.

11. The multifocal lens according to claim 10, wherein, among the waveplates, one or more waveplates are disposed on the incident surface of the first lens, and remaining one or more waveplates are disposed between the first and second lenses or on the opposite surface of the second lens.

12. The multifocal lens according to claim 10, wherein, among the waveplates, one or more waveplates are disposed between the first and second lenses, and remaining one or more waveplates are disposed on the opposite surface of the second lens.

13. The multifocal lens according to claim 10, wherein, among the waveplates, two or more waveplates are stacked and disposed on the incident surface of the first lens, between the first and second lenses, or on an opposite surface of the second lens.

* * * * *